United States Patent
Belt et al.

(10) Patent No.: US 7,293,269 B2
(45) Date of Patent: *Nov. 6, 2007

(54) METHOD AND SYSTEM FOR IDENTIFYING PROGRAM MODULE FUNCTIONALITY NEEDED BY A COMPUTER WHEN DISCONNECTED FROM A NETWORK

(75) Inventors: Jeffrey C. Belt, Bellevue, WA (US); Noah B. Edelstein, Seattle, WA (US); Maithreya Lakshmi Ratan, Redmond, WA (US); Eric S. Schreiber, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/042,298

(22) Filed: Jan. 24, 2005

(65) Prior Publication Data

US 2005/0132063 A1 Jun. 16, 2005

Related U.S. Application Data

(63) Continuation of application No. 09/223,595, filed on Dec. 30, 1998, now Pat. No. 6,848,105.

(51) Int. Cl.
G06F 9/445 (2006.01)
G06F 9/44 (2006.01)
G06F 3/00 (2006.01)

(52) U.S. Cl. ............... 717/178; 715/749; 717/173; 717/177

(58) Field of Classification Search ........ 709/201–207, 709/217–219; 715/501.1–513, 733, 734, 715/737, 749, 715, 740; 717/168–178; 719/311; 707/1–10

See application file for complete search history.

(56) References Cited

U.S. PATENT DOCUMENTS

| | | | |
|---|---|---|---|
| 5,832,218 A * | 11/1998 | Gibbs et al. | 709/203 |
| 5,859,969 A | 1/1999 | Oki et al. | 709/200 |
| 5,995,756 A * | 11/1999 | Herrmann | 717/178 |
| 6,195,678 B1 | 2/2001 | Komuro | 709/202 |
| 6,311,221 B1 * | 10/2001 | Raz et al. | 709/231 |
| 6,507,867 B1 * | 1/2003 | Holland et al. | 709/219 |
| 6,594,682 B2 | 7/2003 | Peterson et al. | 709/102 |

(Continued)

*Primary Examiner*—William Thomson
*Assistant Examiner*—Anya Charles
(74) *Attorney, Agent, or Firm*—Merchant & Gould P.C.

(57) ABSTRACT

Identifying program module functionality needed by a computer when disconnected from a network is disclosed. A document identification engine (DIE) creates a list of files stored locally on the computer. The DIE sends the list of files to a document mapping engine (DME). The DME identifies a proper handler routine for each file in the list of files and sends each file to the proper handler routine(s). The handler routine(s) identifies the application functionality needed to execute each file. The application functionality may include products, features and components. The handler routine sendsd a list of needed application functionality to the DME. If needed, the DME may send any sub-parts of files to another handler for further processing, such as when a word processing document includes a spreadsheet subpart. The DME also can send the list of needed application functionality to a migration engine (ME). The ME determines the current status of the needed application functionality. If the status of the needed application functionality indicates that the needed application functionality is not installed locally on the computer, then the ME installs the needed application functionality to the computer.

15 Claims, 4 Drawing Sheets

U.S. PATENT DOCUMENTS 6,618,754 B1 *  9/2003  Gosling ...................... 709/220
6,769,019 B2 *  7/2004  Ferguson ................... 709/219

2001/0003828 A1  6/2001  Peterson et al. ............ 709/219

* cited by examiner

US 7,293,269 B2

METHOD AND SYSTEM FOR IDENTIFYING PROGRAM MODULE FUNCTIONALITY NEEDED BY A COMPUTER WHEN DISCONNECTED FROM A NETWORK

TECHNICAL FIELD

This invention relates to identifying program module functionality needed by a computer. More particularly, this invention relates to a method and system for identifying the program module functionality needed by a computer when disconnected from a network and storing this program module functionality on the computer's hard drive.

BACKGROUND OF THE INVENTION

Mobile or laptop computing has become more popular as mobile computers have decreased in price and increased in performance. Many mobile computer users use their computers to connect to a network at the office. These same users may disconnect from the network to use their mobile computers when away from the office. Mobile computing demands that users have access in a disconnected environment to the data and the applications that are typically available in a connected environment, i.e., when connected to a network. While preparing for offline use, users generally think in terms of documents, not in terms of applications. Mobile computers do not provide an intelligent list of applications which may be needed when the mobile computer is disconnected from the network.

As mobile computing becomes prevalent, the transition between network-connected use and offline use should be transparent, quick and painless. A mobile computer user should not have to worry about the management of applications and documents on her laptop. The mobile computer user needs to make sure that the documents and applications required when the unit is offline are on the mobile computer before disconnecting it. Thus, there is a need for a method and system for managing the documents and files that are needed on a mobile computer when the mobile computer is disconnected from a network.

However, having needed files and documents on a mobile computer does not mean that the application program functionality needed to run these documents is locally available, i.e. stored on the mobile computer. Thus, there is a need for a method and system for intelligently identifying a list of documents the user may need when offline and mapping the documents to the necessary application program functionality needed to execute the documents.

Thus, given a set of documents, there is a need for a method and system for mapping the set of documents to a set of application program functionality required to run the set of documents. There is a further need for a method and system for a method and system for intelligently identifying a list of documents that may be needed by a user when off-line, i.e., disconnected from a network.

SUMMARY OF THE INVENTION

The present invention satisfies the above described needs by providing a method and system for identifying the program application functionality needed by a computer when disconnected from a network and storing this program module functionality on the computer.

In one aspect, the invention identifies a handler routine for each file saved to a local computer, or marked to be available off-line, and sending each file to the identified handler routine. The handler routine may then determine the application program functionality required to execute each file, i.e., read and edit a file. The application program functionality may comprise products, features and components as defined below in the detailed description.

In another aspect, the invention identifies a handler routine for each file in the set of files by identifying a type for the file by mapping a file extension for each file to a class identification. Then, for each file in the set of files, the class identification is mapped to a handler routine and each file is sent to the mapped handler routine.

In still another aspect, the present invention comprises a document identification engine (DIE) for creating a list of files stored locally on a computer. The DIE sends the list of files to a document-mapping engine (DME), which identifies a proper handler routine for each file in the list of files. The DME then sends each file to the proper handler routine(s). The handler routine(s) identifies the application program functionality needed to execute each file and sends a list of needed application functionality to the DME or a migration engine (ME). The ME determines the current status of the needed application functionality. If the status of the needed application functionality indicates that the needed application program functionality is not installed locally on the computer, then the ME may install the needed application program functionality to the computer.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
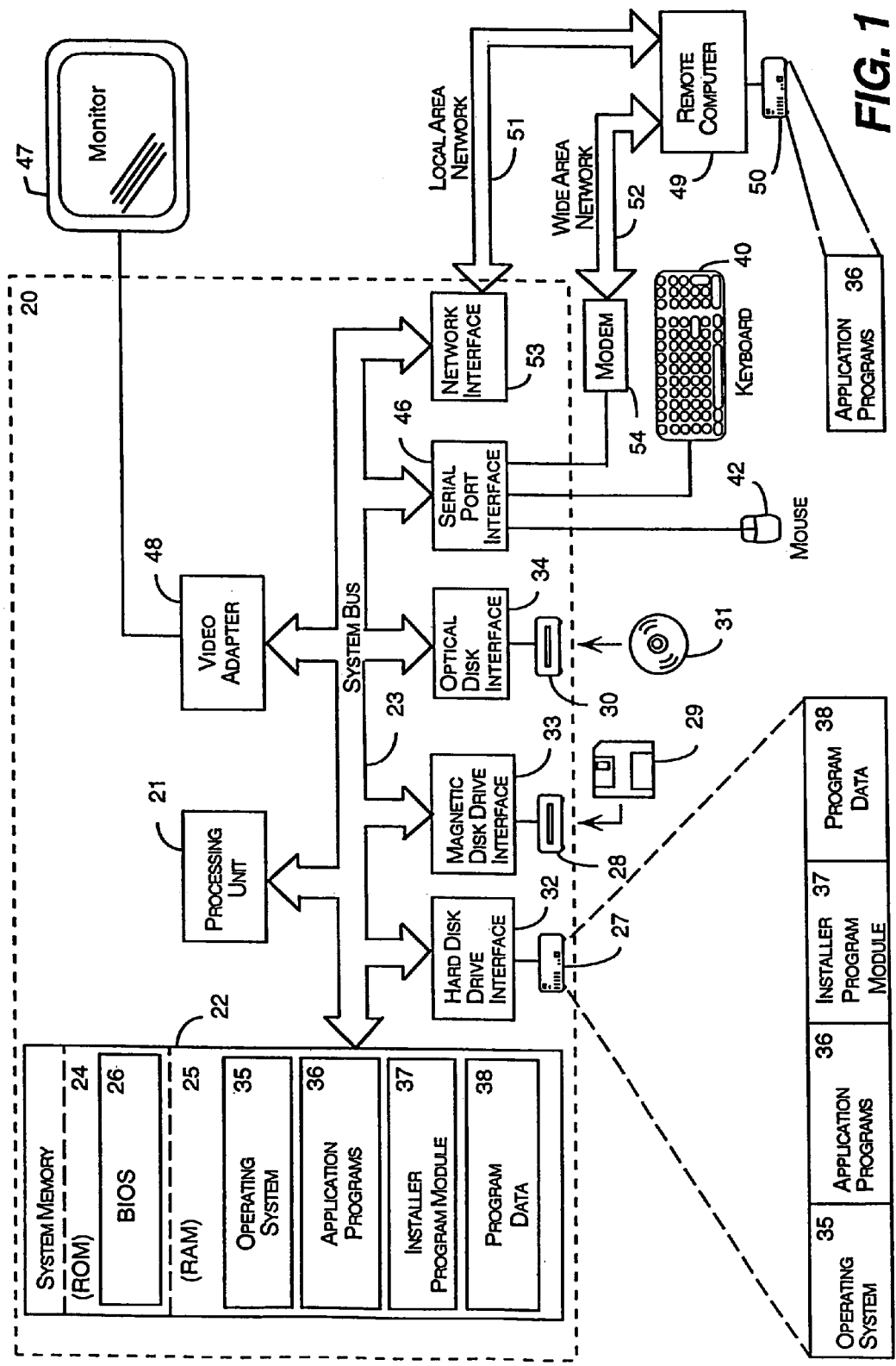
FIG. 1 is a block diagram of a computer that provides the exemplary operating environment for the present invention.

The present invention is directed to a method and system for identifying the application program functionality that may be needed to use a document, or file, when disconnected from a network environment. In one embodiment, the operating system may automatically identify the documents that will likely be needed by the user when his computer is disconnected from the network. The invention may be incorporated into an operating system program module. Briefly described, the operating system allows a user to select the documents, or files, that will be needed by the user when his computer is disconnected from the network. It should be understood that different parts of the operating system, and even other applications, may perform the steps of the invention described herein. In one embodiment, the invention identifies the application program functionality that will be needed to run the documents selected by the user when the computer is disconnected from the network. The present invention may also identify whether this application program functionality is stored locally on the computer, and, if not, the present invention may store this application program functionality locally on the computer.

Having briefly described embodiments of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an operating system that runs in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, installer program module 37, program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Discussion of Terminology

Figure 2:
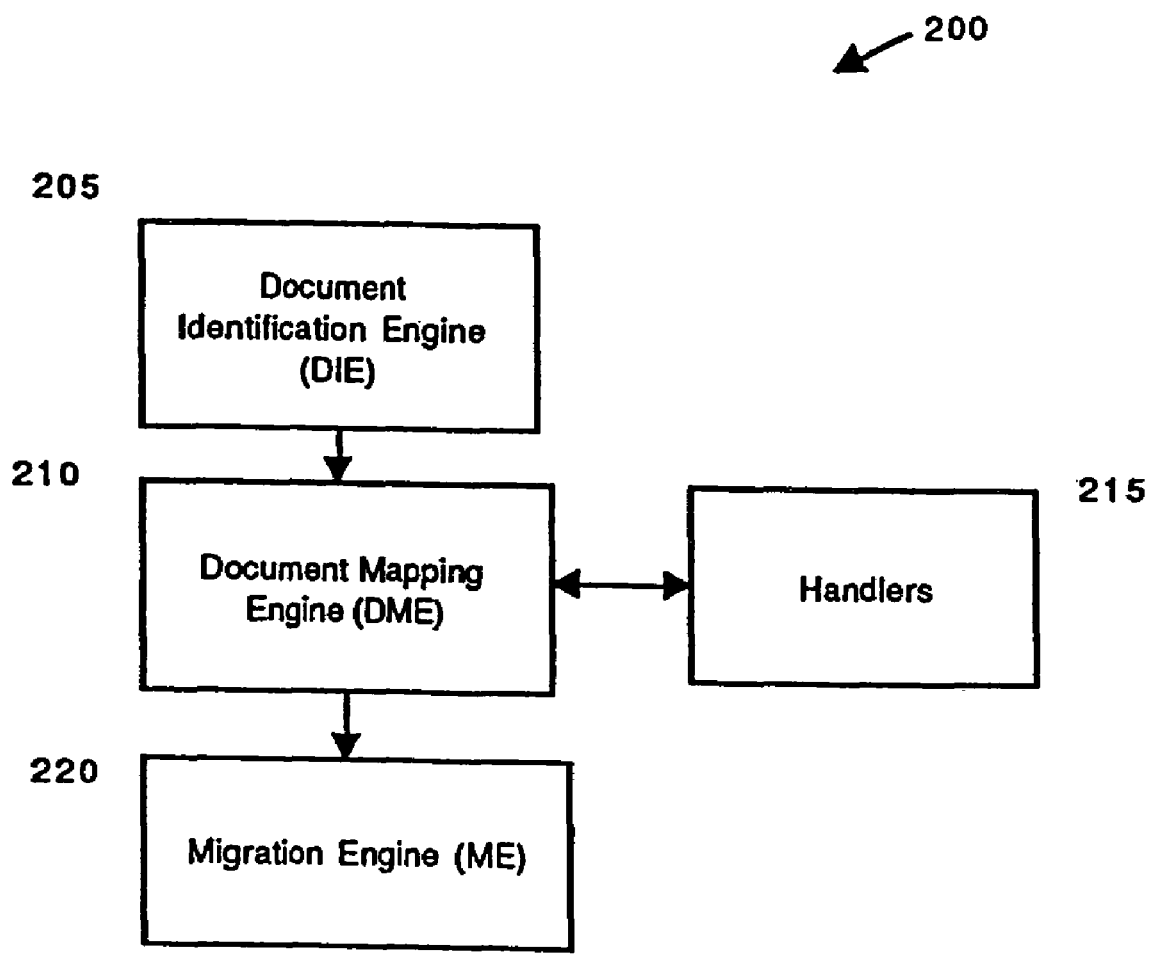
FIG. 2 is a block diagram of typical program modules that may be included in an exemplary embodiment of the present invention.

Before discussing FIG. 2, a brief discussion of terminology is needed. In accordance with an exemplary embodiment of the present invention, the installer program module 37 recognizes three principal elements: products, features and components. The installer program module 37 is also described in U.S. Pat. No. 6,237,144, entitled "Use of Relational Databases for Software Installation," which is assigned to the same assignee, filed on Sep. 21, 1998, and incorporated by reference herein.

A "product" represents an entire application program, such as the "MICROSOFT OFFICE" application program marketed by Microsoft Corporation of Redmond, Wash. Each product has a globally unique identifier known as a Product Code which allows each product to be distinguished. Each product is made up of one or more features.

A feature is a granular piece of the product that a user may choose to install. Features typically correspond roughly to the functional features of the product itself, such as a "Proofing Tools" feature or a "WORD" feature. Each feature is essentially a grouping of components and may also include other features. Features need not be globally unique, and therefore may be identified by any appropriate means, such as with a textual feature identifier.

A component is a collection of resources, such as files or registry keys, that are all installed or uninstalled as a unit. Components are the building blocks of the product that are not exposed to the user. A resource, such as a file or a registry key, may be part of only one component. Two components may not share the same resource whether they are part of the same product or parts of different products. Each component has a globally unique identifier known as a Component Code. One resource within the component is designated as a key file. The key file may be any resource, such as a file or registry key, within the component.

As used herein, application program functionality will be used to refer to products, features and components.

Identifying Needed Files and Application Program Functionality

As mentioned above in the Background, application program modules do not currently provide a management tool that allows users to identify their off-line application needs, and synchronize their data with the applications required to use the data. In addition, data formats are becoming increasingly complex and users need to have a way to manage complex data formats, such as OLE structured storage with embedded OLE objects or HTML pages with multiple links. Moreover, as described above in the Terminology section, some application program modules now have functionality that may be installed on-demand, so there may be more instances of disconnected computers not being able to run documents because the needed functionality may not be installed on the computer. The present invention allows application program modules to be intelligent about document and feature management and, thus, reduces the offline user's burden.

The invention is a system and method for identifying a list of documents, or files, and application program module functionality that a user may need when the computer is disconnected from a network. The invention may be used with laptop computers or desktop computers which are connected to a network.

In one embodiment, the present invention observes the user's usage pattern to make intelligent guesses regarding which documents should be available offline and allows the user to modify the selection. In another embodiment, the present invention identifies class identifications (type and owner) of these selected documents. In still another embodiment, the present invention maps these class identifications to the appropriate product and feature identifications needed to run, or execute, these documents.

Referring now to FIG. 2, a block diagram of typical program modules that may be included in an exemplary embodiment 200 of the present invention is illustrated. Ensuring that the appropriate documents and the required application program functionality are available offline may begin by choosing documents to be made available offline. This is typically performed via a Document Identification Engine (DIE) 205.

The DIE 205 comprises a set of rules and/or a user interface to determine a default list of folders and files the user will have when offline. This default list typically includes, but is not limited to:

The "My documents" folder;
Recently used documents;
Documents and folders that the user has specifically marked as "Need when off-line". For example, every time the user creates/publishes a document, he or she can mark it as "Need when off-line";
The "Desktop" folder; and
Dependent files, e.g., links and embeddings in a document, macros that are associated with command bars, etc.

Given the above set of document locations, or a similar set, the DIE 205 may yield a list of documents required for offline use. Multiple DIEs may be required due to different types of storage (for example, web servers, file servers, MAPI stores, etc.).

This list generated by the DIE 205 is then collected by a Document-Mapping Engine (DME) 210. The DME 210 uses the list to determine which functionalities and applications the user requires. The DME identifies document classes and compiles a list of class identifications.

The DME 210 may yield a set of program module functionalities which is required for the selected offline documents. For each document in the list furnished by the DIE 205, the DME 210 may identify the class ID of the type of document based on document extensions. The DME 210 may also identify the class ID of the type of document by using more than document extensions. For example, for OLE-composed documents, the class ID is actually stored in the file itself. It may then compile this into a list of class identifications to be handed off to the specific document handlers.

As mentioned above, the Document Mapping Engine (DME) 210 may identify the class IDs for each document identified by the Document Identification Engine (DIE) 205. However, it should be understood that mapping a document to a proper handler routine may be performed several different ways, such as by using a document extension, etc. Each document will then be handed to a handler 215 specific to its document type. The handler may then map the file to product and feature identifications known by the installer program module 37. As mentioned, specific document handlers 215 may perform this mapping of document class identifications. Each different handler may return product and feature mappings for a specific document type. For example, one or more OFFICE handlers may understand OFFICE file formats and be able to map format contents to specific OFFICE features.

The handler 215 may identify the product and features necessary for the specified document, and return the required product and features to the DME 210. The DME will collect all of the product and feature identifications for all of the documents, and may sort them according to frequency of the occurrence of any given product and feature ID. However, the handlers themselves may also return importance rankings instead of leaving the decision of importance to the DME. The product and feature identifications are then sent to a Migration Engine 220 (ME).

The Migration Engine (ME) 220 may be able to identify the application functionality that is most critical given the document types that are most prevalent. This list will then be used by the Migration Engine to install the necessary application functionality. It should also be understood that decisions could be made based on factors other than which document types are most prevalent.

In the event that the ME determines that it cannot install all the requested application functionality due to a lack of disk space, it will return the list of documents to the DIE. The DIE will then present the user with an interface that allows them to modify their selection of documents.

Figure 3:
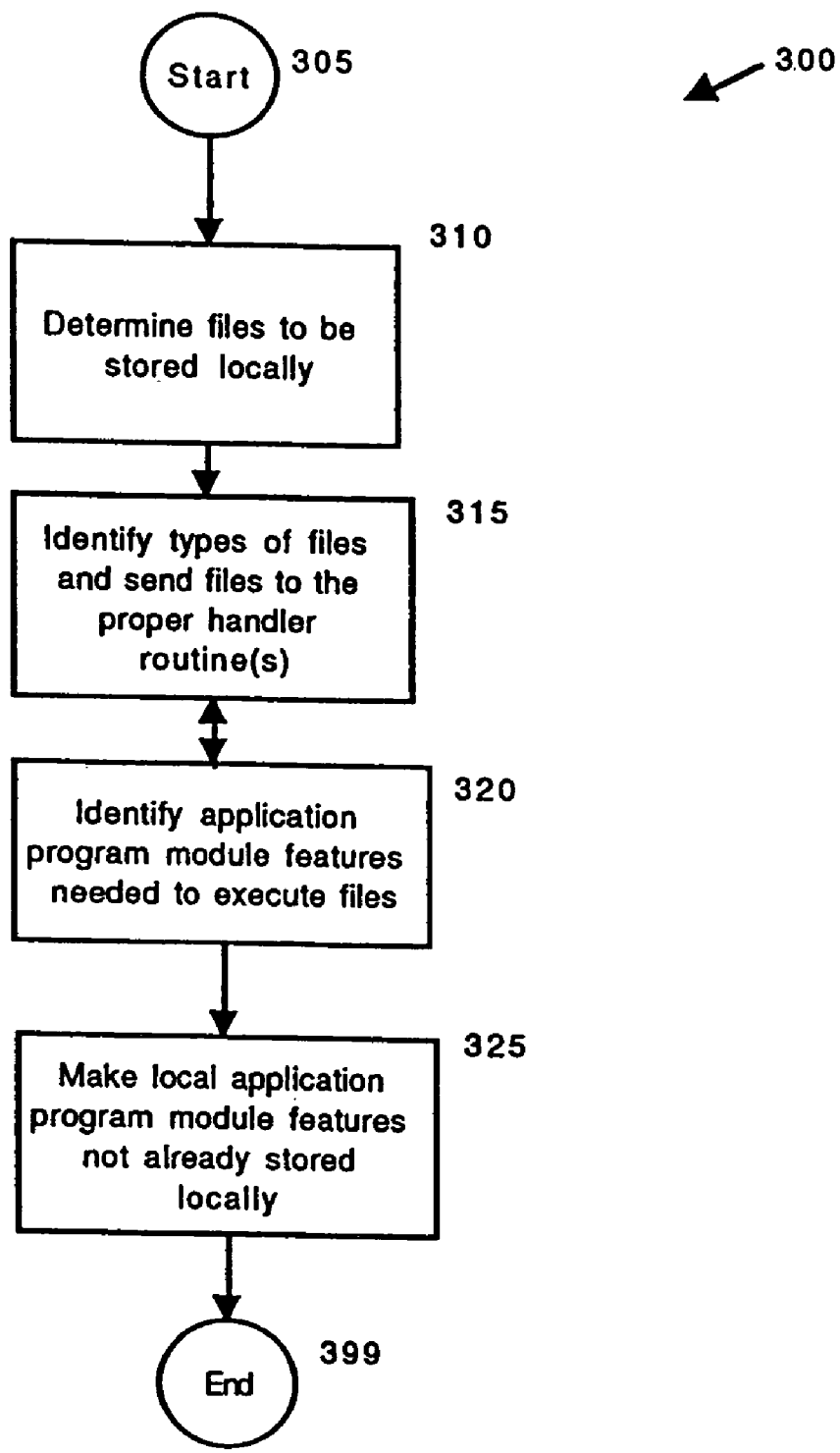
FIG. 3 is a flowchart illustrating a method for identifying application program features needed when a computer is offline in accordance with an embodiment of the present invention.

Referring now to FIG. 3, a flowchart illustrating a method 300 for identifying application program functionality needed when a computer is offline in accordance with an embodiment of the present invention will be described. The method begins at start step 305 and proceeds to step 310. At step 310, the files, or documents, to be stored locally on the computer is determined. It should be understood that the process of determining the files to be stored locally on the computer may be a manual process, such as the user storing files locally on the computer. It should also be understood that the process of determining the files to be stored locally on the computer may be an automatic process. For example, the operating system may include a set of rules for determining a default list of folders and files the user will need when offline.

After the files to be stored locally on the computer are determined at step 310, the method proceeds to step 315. The types of files stored locally on the computer are identified and the files are sent to a proper handler routine at step 315. For example, all WORD files stored locally on the computer are sent to a handler that understands WORD documents. The method then proceeds to step 320.

At step 320, the application program functionality needed to execute the files is identified by the handler routine(s). The method 300 then proceeds to step 325.

At step 325, the application program functionality needed, and not already installed locally, is installed locally on the computer. The method ends at step 399.

Figure 4:
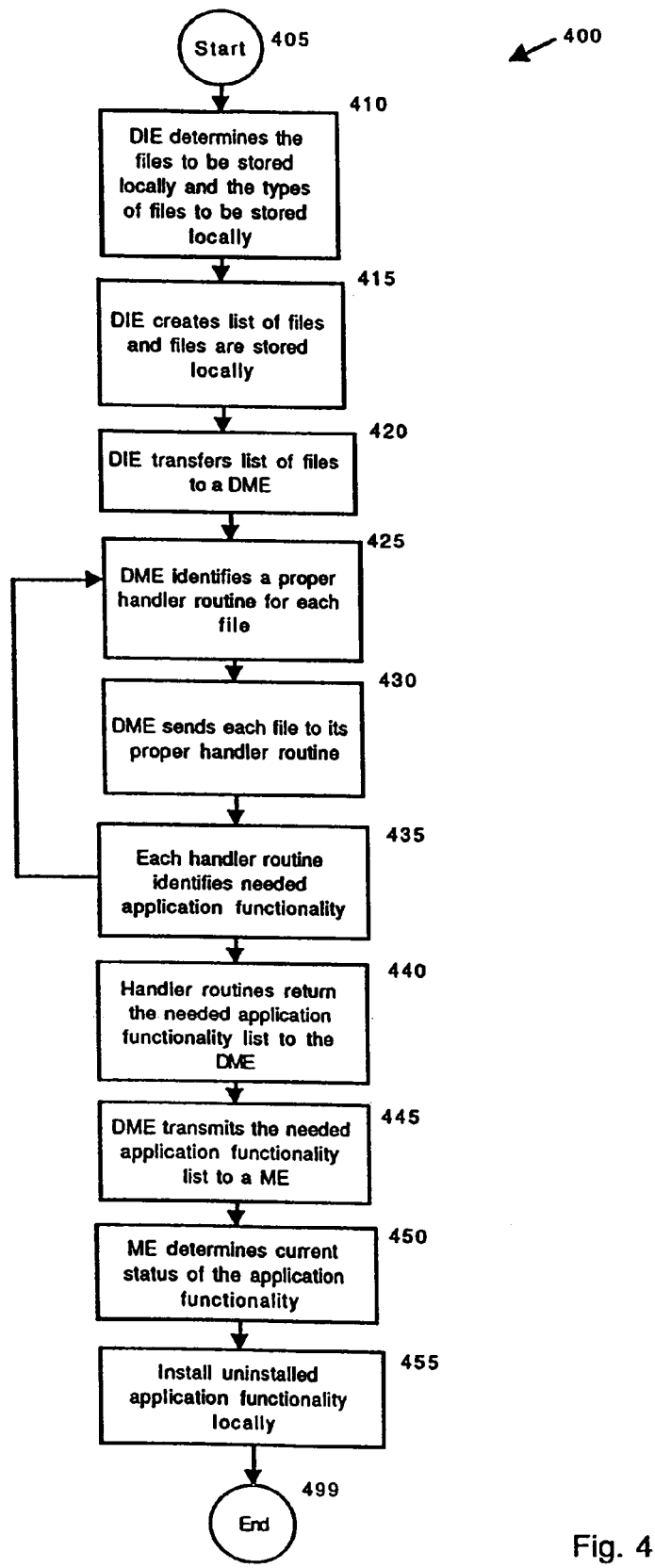
FIG. 4 is a flowchart illustrating a method for identifying application program features needed when a computer is offline in accordance with another embodiment of the present invention.

Referring now to FIG. 4, a flowchart illustrating a method 400 for identifying application program functionality needed when a computer is offline in accordance with an embodiment of the present invention will be described.

The method 400 begins at start step 405 and proceeds to step 410 where a Document Identification Engine (DIE) determines the files, or documents, to be stored on the local computer and the types of files that are to be stored locally (such as .doc, .htm, .xls). The method 400 then proceeds to step 415. The DIE may be triggered when the user shuts down the computer or undocks the computer. The DIE may also be triggered manually by the user from the control panel, start menu, or otherwise.

At step 415, the DIE creates a list of files determined at step 410 and these files are stored locally to the computer if they are not already stored locally. The method 400 then proceeds to step 420.

At step 420, the list of files created by the DIE at step 415 is transferred to a Document Mapping Engine (DME). The method 400 then proceeds to step 425.

At step 425, the DME identifies a handler routine for each file. It should be understood that the DME may identify the type of files by mapping the file extension (such as .doc, .http, .xls) to a class identification. It should be understood that each class identification may be associated with a handler routine. It should also be understood that the proper handler routine may be identified by other means, such as by OLE-compound document CLSID. The method 400 then proceeds to step 430.

At step 430, the DME sends each file to its proper handler routine for processing. The method 400 then proceeds to step 435. At step 435, each handler routine is used to identify specific needs and requirements for a particular file. For example, certain application program functionality may be needed to execute a particular file while other application program functionality may be needed to execute other files. Each handler routine maps a file itself to the application program features that need to be installed for the file to execute. The method 400 then proceeds to step 440.

At step 440, the handler routines return the application program functionality needed for each file to the DME so that the DME has a complete list of all the application program functionality needed to execute the saved local files. The method then proceeds to step 445. It should be understood that it is possible that the DME will need to send one or more new files to a handler routine in response to the instructions from the handler routines. For example, an EXCEL spreadsheet may contain an embedded WORD document. In that case, the EXCEL handler routine may not recognize the WORD document and may return the WORD document to the DME to determine the proper handler routine for the WORD document. The DME would then transmit the WORD document to the proper handler.

At step 445, the DME 210 transmits the list of needed application program functionality to a migration engine (ME) 220. The method then proceeds to step 450. At step 450, the ME 220 determines the current status of the application program functionality, i.e., whether the functionality is available and installed locally. The method then proceeds to step 455.

At step 455, any application program functionality that is not installed locally is installed to the local computer, if it is available. The method 400 then ends at step 499.

Thus, from the foregoing description, it will be apparent to those skilled in the art that the present invention provides a method and system for identifying a set of application program functionality that may be needed on a computer by a user when the computer is disconnected from a network environment, or when a computer does not have a CD-ROM connection. For example, a home user may have a laptop computer with a docking station, but not have the computer connected to a network. When at home, the user can use the CD-ROM drive attached to the docking station to run application bits "from the source." However, when disconnected from the docking station, the laptop computer has no CD-ROM drive and the user will need the bits to be local.

It should be understood that the storing of the application functionality to the local computer may be done on a priority basis to deal with storage constraints. For example, if six word processing documents are stored locally and one spreadsheet document is stored locally, then the application functionality for the word processor should be stored to the local computer before attempting to store the spreadsheet functionality. It should also be understood that the user may be presented with the option of determining which applications need to be stored locally if there are storage constraints.

It should also be understood that if a single file comprises other types of files, then the handler will be able to identify these other type files or send them back to the DME so that they may be sent to a proper handler routine. For example, if a word processing document comprises a spreadsheet document, then the handler will be able to identify these types of files and send them to their proper handler. Thus, the present invention will be able to identify when a single document needs multiple application functionality. This concept may be referred to as embedded mapping. Thus, for any sub-part of a file (such as an OLE sub-storage or a hyperlink), the handler may send the subpart back to the DME which may try to map it to a different handler.

It will also be understood that alternative embodiments will become apparent to those skilled in the art to which the present invention pertains without departing from its spirit and scope. Accordingly, the scope of the present invention is defined by the appended claims rather than the foregoing description.

The invention claimed is:

1. A method of installing an application feature on a first computer system, wherein the first computer system is capable of communicating with a second computer system when the first and second computer systems are connected, the first computer system being unable to communicate with the second computer system when the first and second computer systems are disconnected and wherein the application feature is stored on the second computer system, the method comprising:

automatically identifying at least a first and second user files to be stored on the first computer system, wherein the first user file is of a different type from the second user file;

storing the at least first and second user files on the first computer system;

evaluating the at least first and second user files and user files previously existing on the first computer system, including executing a first handler routine to evaluate the first user file and executing a second handler routine to evaluate the second user file, to determine one or more application features to be stored on the first computer system to allow execution of the evaluated user files when the first computer system is disconnected from the second computer system;

while the first computer system is connected to the second computer system, transferring the one or more application features from the second computer system to the first computer system; storing the one or more application features in the first computer system and disconnecting the first computer system from the second computer system.

2. The method as defined in claim 1 wherein the act of evaluating the user files further involves classifying at least the first and second user files according to type.

3. The method as defined in claim 2 wherein at least the first and second user files have file names and the types are classified by file name extensions.

4. The method as defined in claim 1 wherein at least the first user file further comprises an embedded file, and wherein the method further comprises:

evaluating the embedded file;

determining whether the embedded file requires application features; and transferring application features associated with the embedded file to the first computer system.

5. The method as defined in claim 1 further comprising:

determining a lack of capacity on the first computer system;

receiving user selection of user files;

determining a priority of application features based on the user selection; and transferring application features according to the determined priority.

6. The method as defined in claim 5 further comprising:

receiving user selection of application features; and transferring a limited subset of available application features to the first computer system based on user selection of application features.

7. The method as defined in claim 5 further comprising:

identifying application features existing on the first computer system prior to transferring application features to the first computer system;

comparing existing application features to those identified for transfer; and transferring only those application features not existing on the first computer system.

8. The method as defined in claim 5 further comprising:

determining a likelihood of application feature use; and based on the likelihood of application feature use, determining a priority for transferring application features to the first computer system.

9. The computer readable medium having computer-executable instructions for performing a method for identifying one or more application features needed to access at least a first and second user files when a first computer system is disconnected from a second computer system, the method comprising the steps of:

automatically identifying at least the first and second user files to be stored on the first computer system, wherein the first user file is of a different type from the second user file;

storing at least the first and second user files on the first computer system;

evaluating at least the first and second user files and user files previously existing on the first computer system, including executing a first handler routine to evaluate the first user file and executing a second handler routine to evaluate the second user file, to determine the one or more application features to be stored on the first computer system to allow execution of the evaluated user files when the first computer system is disconnected from the second computer system;

while the first computer system is connected to the second computer system, transferring the one or more application features from the second computer system to the first computer system; storing the one or more application features in the first computer system and disconnecting the first computer system from the second computer system.

10. The computer readable medium as defined in claim 9 wherein the act of evaluating the user files further involves classifying the user files according to type and wherein the user files have file names with file name extensions and the types are classified by file name extensions.

11. The computer readable medium as defined in claim 9 wherein at least the first user file further comprises an embedded file, and wherein the method further comprises:

evaluating the embedded file;

determining whether the embedded file requires application features; and transferring application features associated with the embedded file to the first computer system.

12. The computer readable medium as defined in claim 9 wherein the method further comprises:

determining a lack of capacity on the first computer system;

receiving user selection of user files;

determining a priority of application features based on the user selection; and transferring application features according to the determined priority.

13. The computer readable medium as defined in claim 12 wherein the method further comprises:

receiving user selection of application features; and transferring a limited subset of available application features to the first computer system based on user selection of application features.

14. The computer readable medium as defined in claim 12 wherein the method further comprises:

identifying application features existing on the first computer system prior to transferring application features to the first computer system;

comparing existing application features to those identified for transfer; and transferring only those application features not existing on the first computer system.

15. The method as defined in claim 12 wherein the method further comprises:

determining a likelihood of application feature use; and based on the likelihood of application feature use, determining a priority for transferring application features to the first computer system.

* * * * *